US008560618B2

(12) United States Patent
Pacheco-Sanchez et al.

(10) Patent No.: US 8,560,618 B2
(45) Date of Patent: Oct. 15, 2013

(54) CHARACTERIZING WEB WORKLOADS FOR QUALITY OF SERVICE PREDICTION

(75) Inventors: Sergio Pacheco-Sanchez, Belfast (GB); Giuliano Casale, Pavia (IT)

(73) Assignee: SAP AG, Walldorf (DE)

(*) Notice: Subject to any disclaimer, the term of this patent is extended or adjusted under 35 U.S.C. 154(b) by 118 days.

(21) Appl. No.: 13/174,892

(22) Filed: Jul. 1, 2011

(65) Prior Publication Data

US 2013/0007259 A1      Jan. 3, 2013

(51) Int. Cl.
 *G06F 15/16* (2006.01)
 *G06F 15/173* (2006.01)
 *G06Q 10/00* (2012.01)

(52) U.S. Cl.
 USPC .......................... 709/206; 709/226; 705/7.29

(58) Field of Classification Search
 USPC ....................................................... 709/224
 See application file for complete search history.

(56) References Cited

U.S. PATENT DOCUMENTS

| | | | | |
|---|---|---|---|---|
| 5,960,181 A | * | 9/1999 | Sanadidi et al. | 703/21 |
| 7,865,567 B1 | * | 1/2011 | Hendricks et al. | 709/214 |
| 2002/0198995 A1 | * | 12/2002 | Liu et al. | 709/226 |

OTHER PUBLICATIONS

M.M. Rashid el al , "An analytical approach to providing controllable differential Quality of Service in web servers", IEEE, vol. 16, No. 11, Nov. 2005, pp. 1022-1033.*

G. Casale et al , KPC-Toolbox: Simple yet effective trace fitting using Markovian Arrival Processes:, QEST, pp. 83-92, Sep. 2008.*
Marcel F. Neuts, "Structured Stochastic Matrices of M/G/1 Type and Their Applications," Marcel Dekker, Inc., 1989, 529 pages.
Roger A. Horn et al., "Topics in Matrix Analysis," Cambridge University Press, 1994, 613 pages.
G. Latouche et al., "Introduction to Matrix Analytic Methods in Stochastic Modeling," American Statistical Association (ASA) and the Society for Industrial and Applied Mathematics (SIAM), 1999, 349 pages.
Chris Chatfield, "The Analysis of Time Series: An Introduction," Chapman & Hall/CRC Press LLC, 2004, 176 pages.
Andersson et al., "Performance Modeling of an Apache Web Server with Bursty Arrival Traffic," Proceedings of the 4th International Conference on Internet Computing, IC'03, Jun. 23-26, 2003, Las Vegas, NV, 45 pages.
M. Armbrust et al., "A Ciew of Cloud Computing," Communications of the ACM, vol. 53, No. 4, Apr. 2010, pp. 50-58.
S. Asmussen et al., "Fitting Phase-type Distributions via the EM Algorithm," Scandinavian Journal of Statistics, vol. 23, No. 4, pp. 419-441, Dec. 1996.
P. Barford et al., "Generating Representative Web Workloads for Network and Server Performance Evaluation," In Proceedings of ACM SIGMETRICS International Conference on Measurement and Modeling of Computer Systems, pp. 151-160, Jul. 1998.

(Continued)

Primary Examiner — Asghar Bilgrami
(74) Attorney, Agent, or Firm — Fish & Richardson P.C.

(57) ABSTRACT

Implementations of the present disclosure provide systems and methods directed to receiving, at a computing device, trace data provided in a trace log file corresponding to a server, parameterizing, using the computing device, a first Markovian Arrival Process (MAP) model based on the trace data, parameterizing, using the computing device, a second MAP model based on the trace data, defining a queuing model that models a performance of the server and that includes the first MAP model and the second MAP model, and storing the queuing model in computer-readable memory.

20 Claims, 5 Drawing Sheets

(56) References Cited

OTHER PUBLICATIONS

F. Bause et al., "A Comparison of Markovian Arrival and ARMA/ARTA Processes for the Modeling of Correlated Input Processes," In Proceddings of 2009 Winter Simulation Conference, pp. 634-645, Dec. 2009.
P. Buchholz et al., Multi-class Markovian arrival processes and their parameter fitting, Performance Evaluation: An International Journal, 67:1092-1106, 2010.
G. Casale et al., "KPC-Toolbox: Simple Yet Effective Trace Fitting Using Markovian Arrival Processes," In Proceedings of the $5^{th}$ Conference on Quantitative Evaluation of Systems (QEST), pp. 83-92, Sep. 2008.
A. Dempster et al., "Maximum Likelihood From Incomplete Data via the EM Algorithm," Journal of the Royal Statistical Socieity, Series B (Methodological), vol. 23, vol. 1, 1977, pp. 1-38.
A. Heindl, "Traffic-Based Decomposition of General Queueing Networks with Correlated Input Processes," PhD thesis, 2001, 189 pages.
A. Heindl et al., "Correlation bounds for second-order MAPs with application to queueing network decomposition," Performance Evaluation: An International Journal, 63(6):553-577, 2006.
Kwiatkowski et al., "Testing the null hypothesis of stationarity against the alternative of a unit root," Journal of Econometrics, vol. 54(1-3), pp. 159-178, 1992.
D. Lucantoni, "New Results on the Single Server Queue with a Batch Markovian Arrival Process," Stochastic Models, vol. 7, No. 1, pp. 1-46, 1991.
N. Mi et al., "Sizing Multi-Tier Systems with Temporal Dependence," J. Internet Serv. Appl., pp. 1-18, Sep. 2010.
A. Riska et al., "Matrix-Analytic Analysis of a MAP/PH/1 Queue Fitted to Web Server Data," In Proceedings of the Fourth International Conference on Matrix Analytic Methods in Stochastic Models, Matrix-Analytic Methods: Theory and Applications, World Scientific, pp. 335-356, Jul. 2002.

R. Singh et al., "Autonomic Mix-Aware Provisioning for Non-Stationary Data Center Workloads," Proceedings of the 7th International Conference on Autonomic Computing, ICAC '10, pp. 21-30, Jun. 2010.
A. Thummler et al., "A Novel Approach for Fitting Probability Distributions to Real Trace Data with the EM Algorithm," In the Proceedings of the International Conference Dependable Systems and Networks, pp. 712-721, Jun. 28-Jul. 1, 2005.
H. Zhang et al. "Intelligent Workload Factoring for a Hybrid Cloud Computing Model," 2009 Congress on Services—I, pp. 701-708, 2009.
Q. Zhang et al., "Workload-aware Load Balancing for Clustered Web Servers," IEEE Transactions on Parallel and Distributed Systems, vol. 16, No. 3, pp. 219-233, Mar. 2005.
Sergio Pacheco-Sanchez et al., "Markovian Workload Characterization for QoS Prediction in the Cloud," Proceedings of the 2011 IEEE 4th International Conference on Cloud Computing, CLOUD'11, 2011, pp. 147-154.
Extended European Search Report for Application No. EP 12004305.4, dated Sep. 14, 2012, 8 pages.
M.M. Rashid et al., An Analytical Approach to Providing Controllable Differentiated Quality of Service in Web Servers,: IEEE Transactions on Parallel and Distributed Systems, vol. 16, No. 11, Nov. 1, 2005, pp. 1022-1033.
Xue Liu et al., "Timing Performance Control in Web Server Systems Utilizing Server Internal State Information," Proceedings of the Joint International Conference on Autonomic and Autonomous Systems 2005 / International Conference on Networking and Services 2005 (ICAS/ICNS 2005), Oct. 2005, 5 pages.
Yiyu Chen et al., "Managing Server Energy and Operational Costs in Hosting Centers," Proceedings of the 2005 ACM Sigmetrics International Conference on Measurement And Modeling of Computer Systems, SIGMETRICS'05, Jun. 2005, pp. 303-314.

\* cited by examiner

| $B^{(i)}$ | Size dataset | Stationary IAT | Stationary SVCT | ACF-1 IAT | ACF-1 SVCT | IAT | SVCT |
|---|---|---|---|---|---|---|---|
| 1 | 437 | Yes | No | 0.28 | 0.89 | 24 | 0.88 |
| 2 | 1972 | No | No | 0.42 | 0.81 | 17 | 2.29 |
| 3 | 4313 | No | No | 0.14 | 0.70 | 30 | 2.57 |
| 4 | 1228 | Yes | No | 0.16 | 0.77 | 14 | 2.27 |
| 5 | 1229 | No | No | 0.11 | 0.68 | 28 | 2.48 |
| 6 | 2077 | No | No | 0.13 | 0.78 | 20 | 2.87 |
| 7 | 510 | Yes | No | 0.08 | 0.80 | 39 | 1.11 |

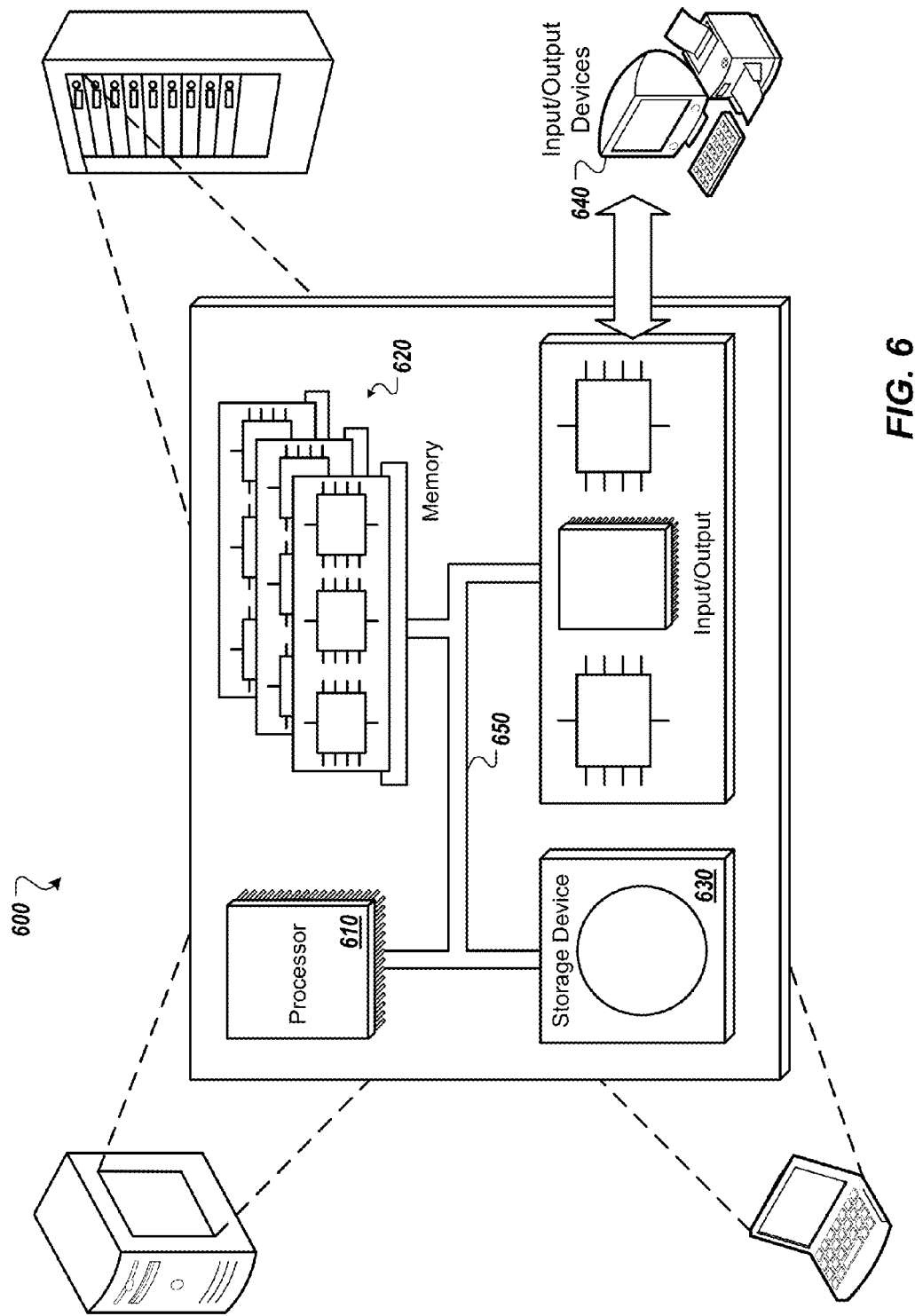

CHARACTERIZING WEB WORKLOADS FOR QUALITY OF SERVICE PREDICTION

BACKGROUND

Resource allocation in online systems (e.g. data centers, server pools) can be driven by performance predictions, such as estimates of future incoming loads to servers and/or of the quality-of-service (QoS) offered by applications to end users. In this context, accurately characterizing web workload fluctuations supports the provision of resources under time-varying traffic intensities. Fitting and predicting web workloads, for example, supports system management tasks, such as deployment and provisioning, as well as the design of cloud computing solutions, selecting load balancing and scheduling policies, and performing capacity planning exercises. As data centers become larger and their workloads increase in complexity, performing such activities via trial-and-error can become impractical.

SUMMARY

Implementations of the present disclosure are generally directed to providing a method for generating a queuing model that describes the performance of a server. In some implementations, the server is a web server that can service a client request. In general, implementations provide a maximum likelihood (ML) method for fitting a Markovian Arrival Process (MAP) to the web traffic measurements collected in commonly available hypertext transfer protocol (HTTP) web server traces. Implementations further provide for parameterizing a MAP/MAP/1 queuing model for server performance prediction, which supports the handling of short traces during modeling and simulation activities, different requests types in HTTP workloads, and which can account for batches of requests that arrive simultaneously to the server.

In some implementations, methods include the actions of receiving, at a computing device, trace data provided in a trace log file corresponding to a server, parameterizing, using the computing device, a first Markovian Arrival Process (MAP) model based on the trace data, parameterizing, using the computing device, a second MAP model based on the trace data, defining a queuing model that models a performance of the server and that includes the first MAP model and the second MAP model, and storing the queuing model in computer-readable memory.

In some implementations, the server includes a web server.

In some implementations, the trace data includes data corresponding to a plurality of requests arriving at the server.

In some implementations, each request of the plurality of requests is one of a static request and a dynamic request.

In some implementations, parameterizing the first MAP model is based on request inter-arrival times.

In some implementations, the request inter-arrival times are computed based on timestamps provided in the trace data.

In some implementations, a request inter-arrival time is provided as a time elapsed between successive requests received at the server.

In some implementations, actions further include removing sequences of zero inter-arrival times from the inter-arrival times that have been requested to provide an adjusted set of inter-arrival times.

In some implementations, parameterizing the first MAP model is based on the adjusted set of inter-arrival times.

In some implementations, parameterizing the first MAP model is achieved using a maximum likelihood fitting method.

In some implementations, parameterizing the second MAP model is based on a plurality of service times, the service times being determined from the trace data.

In some implementations, actions further include determining the service times based on whether each of the plurality of requests is one of a static request and a dynamic request.

In some implementations, a service time is provided as a time that the server spends servicing a request.

In some implementations, actions further include aggregating the service times.

In some implementations, actions further include splitting the trace data into blocks.

In some implementations, actions further include calculating one or more performance metrics using the queuing model.

In some implementations, the one or more performance metrics include one or more of a tail distribution of the plurality of requests, a mean queue length, and a mean response time of system requests.

In some implementations, actions further include receiving user input at the computing device, and providing the user input as input to the queuing model, wherein the one or more performance metrics are calculated based on the user input.

The present disclosure further provides systems for implementing the methods provided herein. In some implementations, systems include at least one or more processors operable to execute instructions to cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 6 is a schematic illustration of exemplar computer systems that can be used to execute implementations of the present disclosure.

Like reference symbols in the various drawings indicate like elements.

DETAILED DESCRIPTION

Implementations of the present disclosure are generally directed to modeling arrival times and service times of requests received at a server system in order to provide a prediction of the performance of the server system. In some implementations, the server is a web server that can service a client request. Average incoming traffic to a server system can vary considerably as a function of time; therefore, this dynamic process does not comply with the concept of stationarity used in statistical modeling. In order to capture the uncertainty in the evolution of incoming traffic to the server system, the arrival of incoming traffic can be modeled as a stochastic process, such as a Markovian Arrival Process (MAP), which can be readily integrated within analytical queuing models that predict the performance of a server system. At the large scale on which server systems can operate, there is an increasing need for effective models to predict their expected performance and future resource usage levels. Performance modeling of web server systems is further complicated because available hypertext transfer protocol (HTTP) server measurements are often logged at a coarse one-second resolution. Consequently, for busy web servers, tens or even hundreds of requests can arrive within a single second, and thus, the arrival distribution across the sampling period of one second is unknown. Accordingly, implementations of the present disclosure address such issues by providing a methodology that addresses batch arrivals. In some examples, the queuing model can then be used to inexpensively (in terms of processing power required) compute performance metrics, such as queue length of requests waiting to be served, expected response times at server side and server utilization, which can be quantified as a percentage of the total server capacity.

Figure 1:
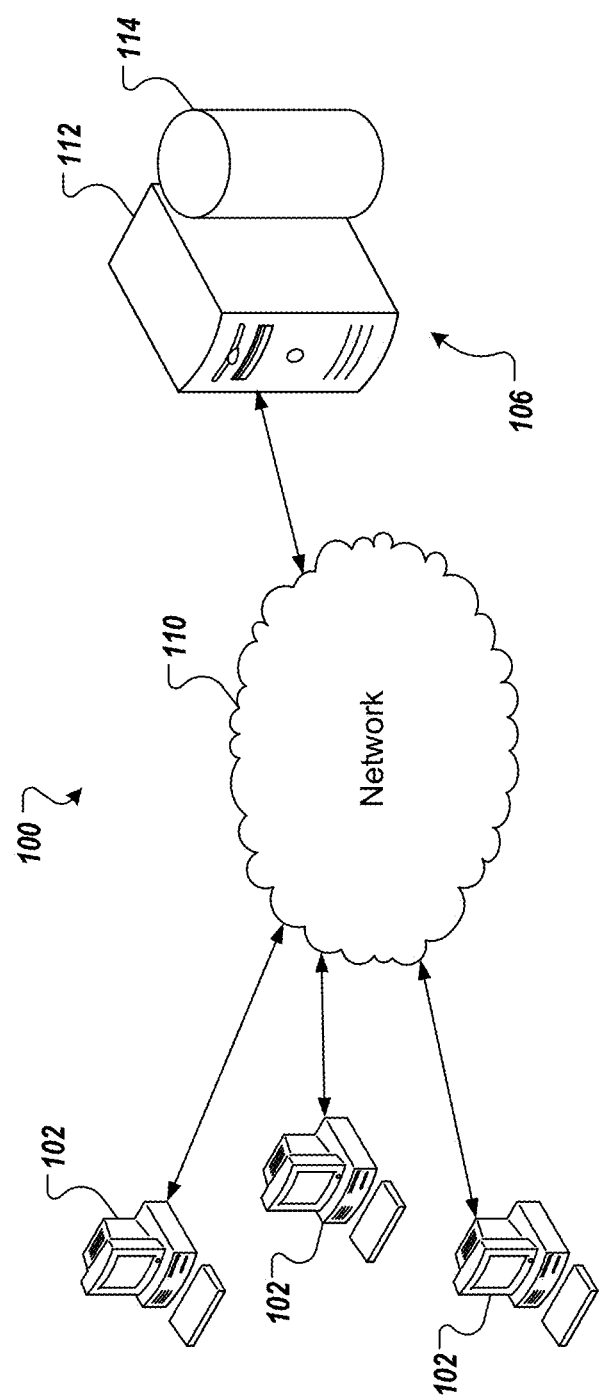
FIG. 1 depicts an example system in accordance with implementations of the present disclosure.

With particular reference to FIG. 1, an example system 100 is illustrated. The example system 100 of FIG. 1 can be provided as a client-server system including a plurality of client computers 102 that communicate with one or more back-end server systems 106 over a network 110. The network can be provided as a large computer network, such as a local area network (LAN), wide area network (WAN), the Internet, a cellular network, or a combination thereof connecting any number of mobile clients and servers. In some implementations, the clients 102 may be directly connected to the server system 106 (without connecting through the network, for example).

The client computers 102 represent various forms of processing devices including, but not limited to, a tablet computer, a desktop computer, a laptop computer, a handheld computer, a personal digital assistant (PDA), a cellular telephone, a network appliance, a camera, a smart phone, an enhanced general packet radio service (EGPRS) mobile phone, a media player, a navigation device, an email device, a game console, or a combination of any two or more of these data processing devices or other data processing devices. The server system 106 includes an application server 112 and a database 114, and is intended to represent various forms of servers including, but not limited to a web server, an application server, a proxy server, a network server, and/or a server pool. In general, the server system 106 accepts user requests for application services and provides such services to any number of client devices 102 over the network 110. In some implementations, the server system 106 can provide a central point through which service-providers can manage and access data related to web services.

In operation, multiple clients 102 can communicate with server system 106 through the network 110. In order to run an application, such as a browser-based application, for example, each client 102 can establish a corresponding session with the server system 106. Each session can involve two-way information exchange between the server system 106 and each individual client 102. This two-way information exchange can include requests generated at the client 102 that are communicated to the server system 106. The server system 106 receives the requests, queues multiple requests, executes processes based on the requests, and provides a response to the requesting client 102.

Implementations of the present disclosure are directed to modeling arrival times and service times of requests received at a server system (e.g., server system 106 of FIG. 1). In some implementations, the server is a web server that can service a client request. The average incoming traffic to a server 106 varies considerably as a function of time; therefore, this dynamic process does not comply with the concept of stationarity used in statistical modeling. Stationarity provides that a random variable oscillates around a mean value at all times. Furthermore, allocating resources based on modeling that fails to account for the time dependence in the stream of arrival times and service times can have a negative effect on the performance of multi-tier Enterprise software systems. In order to capture the uncertainty in the evolution of incoming traffic to a server system, the arrival of incoming traffic can be modeled as a stochastic process, such as a MAP, which can be readily integrated within analytical queuing models.

Generally, implementations of the present disclosure are directed to providing a queuing model that approximates service performance of a server system (e.g., server system 106 of FIG. 1). Implementations of the present disclosure use trace data provided in a trace to parameterize MAP models that are used to define the queuing model. Appropriate parameterization (i.e., parameter fitting) of the MAP model can generate samples that are statistically a close approximation to the events observed in the trace. The queuing model can be utilized as a tool for resource allocation within client-server systems by providing performance metrics that can be used as criteria for triggering further actions, such as resource allocation actions that start-up a server.

A queuing model is a model that approximates a real queuing system so that the queuing behavior can be analyzed using performance measures. Queuing models can be represented using Kendall's notation, which is provided as: A/B/S/K/N/Disc, where A is the inter-arrival time (IAT) distribution; B is the service time distribution; S is the number of servers, for example; K is the system capacity; N is the calling population; and Disc is the scheduling discipline assumed. In some instances, K, N and Disc are omitted, so the notation becomes A/B/S. Standard notation for distributions A and/or B include M for a Markovian (exponential) distribution, $E_K$ for an Erlang distribution with κ phases, D for Degenerate (or Deterministic) distribution (constant), G for General distribution (arbitrary), and PH for a Phase-type distribution. As discussed herein, implementations of the present disclosure are directed to MAP descriptions for A and B.

Figures 2, 3:
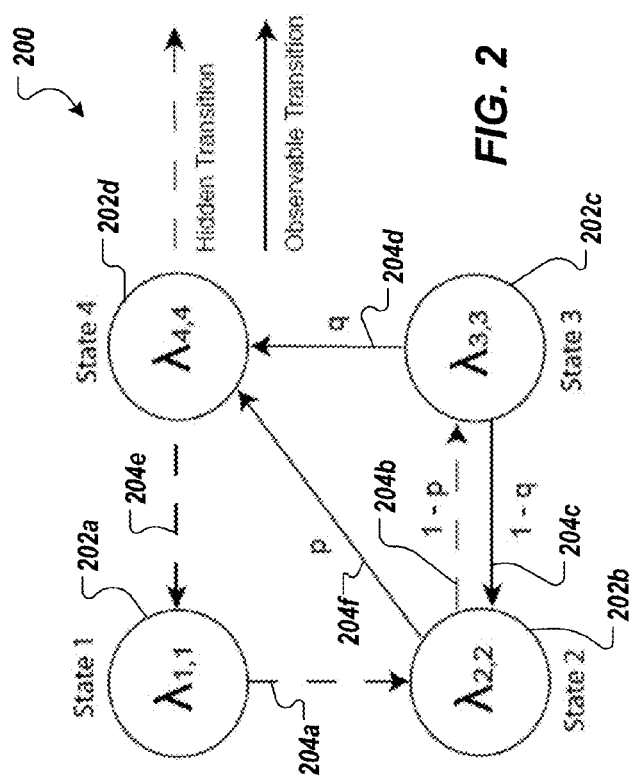
FIG. 2 depicts a directed graph corresponding to an example Markovian Arrival Process (MAP).
FIG. 3 depicts a table providing example trace characteristics.

Referring now to FIG. 2, a MAP can be represented in a model provided as an example directed graph 200. The example directed graph includes nodes 202a, 202b, 202c, 202d (collectively referenced as 202) and relationships 204a, 204b, 204c, 204d, 204e (collectively referenced as 204) between nodes 202. Each node 202 represents a state (J), and the relationships 204 represent transitions between states. In some examples, the transitions include hidden transitions and observable transitions. In some examples, a hidden transition changes an active state (i.e., the current state of the MAP at a given time t), and an observable transition changes the active state and emits a sample s, as discussed in further detail herein.

An active state at time t can be provided as $X(t) \in \{1, 2, \ldots, J\}$. When the model is in state k, the model spends time $t_k$ in state k before moving into state j≠k. Provided that $t_k$ follows an exponential distribution (e.g., $Pr(t_k=t)=\lambda_{k,k}e^{-\lambda_{k,k}t}$), X(t) can be provided as a continuous-time Markov chain (CTMC). The destination state j after a transition is selected according to probabilities (e.g., $p_{k,j}$, $\Sigma_{j=1}^{J} p_{k,j}=1$).

A MAP extends a CTMC by governing the parameters that determine an IAT. In some examples, an IAT is provided as the time elapsed between two successive requests received at a server system. Upon transitioning from state k to state j, the MAP can define probabilities (e.g., $p_{k,j}^{h}$ and $p_{k,j}^{o}$, $p_{k,j}^{h}+p_{k,j}^{o}=p_{k,j}$) that the transition can be either a hidden transition or an observable transition. A hidden transition has the effect of changing only the active state X(t). An observable transition not only changes the active state X(t), but it also results in emission of a sample $s_i$. In other words, an IAT sample of a measured trace can be modeled in the MAP as the time elapsed between successive activations of any two observable transitions.

The MAP can be mathematically represented by a matrix pair $(D_0, D_1)$, where both matrices have order J equal to the number of states. An example matrix pair $(D_0, D_1)$ corresponding to the example directed graph 200 of FIG. 2 can be provided as follows:

$$D_0 = \begin{bmatrix} -\lambda_{1,1} & p_{1,2}^{h}\lambda_{1,1} & 0 & 0 \\ 0 & -\lambda_{2,2} & p_{2,3}^{h}\lambda_{2,2} & 0 \\ 0 & 0 & -\lambda_{3,3} & 0 \\ p_{4,1}^{h}\lambda_{4,4} & 0 & 0 & -\lambda_{4,4} \end{bmatrix} \quad (1)$$

$$D_1 = \begin{bmatrix} 0 & 0 & 0 & 0 \\ 0 & 0 & 0 & p_{2,4}^{o}\lambda_{2,2} \\ 0 & p_{3,2}^{o}\lambda_{3,3} & 0 & p_{3,4}^{o}\lambda_{3,3} \\ 0 & 0 & 0 & 0 \end{bmatrix} \quad (2)$$

where the inverse values of $\lambda_{k,k}$ (diagonal elements in $D_0$) represent the time spent in state k before a jump, $p_{1,2}^{h}=p_4$, $1^{h}=1$, $p_{2,3}^{h}=1-p$, $p_{2,4}^{o}=p$, $p_{3,2}^{o}=1-q$, and $p_{3,4}^{o}=q$. Thus, $D_0$ provides the rates of hidden transitions, while $D_1$ provides the rates of observable transitions. The $D_0$ matrix has off-diagonal elements in position (i,j) representing a transition from state i to state j that does not lead to the emission of samples, while the $D_1$ matrix elements are transitions associated with the emission of samples. The diagonal of $D_0$ is such that $D_0$ plus $D_1$ is an infinitesimal generator of a Markov chain describing the evolution of the active state over time.

The matrix pair $(D_0, D_1)$ also provides a compact description of the statistical properties of the samples $s_i$ generated by the MAP. In some examples, the statistical properties of samples $s_i$ are defined on a stationary time series of MAP samples. The stationary time series can be obtained, for example, by initializing the MAP in state j according to probability $\pi_j \in \vec{\pi}$, where the row vector $\vec{\pi}$ is the left eigenvector of $P=(-D_0)^{-1}D_1$ such that $\vec{\pi} P = \vec{\pi}$ and $\vec{\pi}\vec{1}=1$, where $\vec{1}=(1, 1, \ldots, 1)^T$ is a vector of ones of length J.

The statistics of a sample $s_i$ generated by a stationary MAP are provided by formulas including those that define the cumulative distribution function F(X), the moments of the sample distribution $E[X^k]$, the joint moments of the sample distribution $E[X_0X_k]$, and the autocorrelation function coefficient at lag k (ACF-k) $\rho_k$, each of which can be respectively provided as:

$$F(X) = Pr[s \leq X] = 1 - \vec{\pi}e^{D_0 X}\vec{1} \quad (3)$$

$$E[X^k] = k!\vec{\pi}(-D_0)^{-k}\vec{1}, k \geq 1 \quad (4)$$

$$E[X_0X_k] = \vec{\pi}(-D_0)^{-1}P^k(-D_0)^{-1}\vec{1} \quad (5)$$

$$\rho_k = \frac{E[X_0X_k] - E[X]^2}{E[X^2] - E[X]^2} \quad (6)$$

where $\lambda=1/E[X]$, and $X_0$ and $X_k$ are samples that are $k \geq 1$ lags apart. When $\rho_k=0$, for all k, there are no correlations between the samples, and the MAP reduces to a PH distribution. In some examples, a PH distribution can model the moments or cumulative distribution function of a time series, but it cannot model time-varying patterns. Consequently, a trace T and a trace T' obtained by randomly shuffling T have the same PH distribution models, for example, but do not have the same MAP models.

Referring again to FIG. 2, the example MAP represented by the directed graph 200 can be initialized in "State 1," node 202a, where the MAP spends time $t_1$, can transition to "State 2," node 202b, where the MAP spends time $t_2$, and can transition to "State 4," node 202d, which generates the example sample value $s_0=t_1+t_2$. A next sample $s_1$ can be generated from "State 4," node 202d. Consequently, the time $t_4$ spent in "State 4," node 202d, is included in $s_1$. Successive visits to the same state can be cumulatively accounted for in the generated sample. Furthermore, because sample $s_i$ is generated according to the target state of the observable transition that defines $s_i-1$, carefully defined observable state transitions can provide statistical correlations (e.g., Equation 6) between consecutive samples generated by the MAP. As time passes, a MAP is able to generate an increasing number of samples $s_i$, $i \geq 0$. Appropriate selection of MAP parameters can impose statistical properties on the samples in order to fit the characteristics of the measured trace.

In some examples, a MAP can be provided as a model of the incoming web traffic received at a server system ($MAP_{IAT}$). Consequently, a sample $s_i$ represents the IAT between successive HTTP requests received at the server system. In some examples, a MAP can model the service time (SVCT) of a request arriving at the server system ($MAP_{SVCT}$). The SVCT can be defined as the time period during which a request is being serviced (i.e., the amount of time during which computational resources are consumed to serve a request). In this case, a sample $s_i$ represents the SVCT of a request being serviced at the server system. In some implementations, a $MAP_{IAT}/MAP_{SVCT}/1$ queuing model can be generated based on fitting a MAP to HTTP request IATs to provide $MAP_{IAT}$, and fitting a MAP to HTTP request SVCTs to provide $MAP_{SVCT}$. The $MAP_{IAT}/MAP_{SVCT}/1$ queuing model models the expected performance of the web server. In some implementations, the model can be solved analytically; in some implementations, the model can be solved by using simulation. Solving the model analytically is generally quicker than solving the model by using simulation. Consequently, the $MAP_{IAT}/MAP_{SVCT}/1$ queuing model improves optimization-based QoS management for exploring a wide set of decision alternatives and is faster and in a scalable form if solved analytically, rather than by using simulation.

In some implementations, a server system can provide a server access log having information that includes a timestamp $T_n$ of an n-th client request with a default resolution of one second and the size (in bytes) of the object returned to the client. In some examples, the server system handles requests for static content from main memory, while the server system forwards dynamic requests to the back-end before replying to the client. The time to transmit objects to the client for static requests can be estimated by the size of the objects. In this manner, the estimated time fully represents the time resource consumption of static requests. In some examples, the time resource consumption of dynamic requests can be approximated by aggregating the time to generate the content (including database and application server activity) and the time to transfer the content through the network. The time to generate dynamic content can be drawn from a Lognormal distribution with mean $\mu$ and squared coefficient of variation $c^2$, which is the square of the ratio of the standard deviation to the mean.

The average incoming traffic to a server system varies considerably during the period of a day. Therefore, this dynamic process, does not comply with stationarity assumptions used in statistical modeling. In order to address this problem, the traces can be broken down into smaller datasets that represent a period where the average behavior of a server can be assumed stationary. In some implementations, the server is a web server that can service a client request, and in some examples, trace data can be split into blocks of one-hour traffic, for example. The i-th 60-minute traffic block $B^{(i)}$ can be provided as an ordered sequence of $len(B^{(i)})$ HTTP requests sent to a server. The download of a web page can be broken down into individual HTTP requests of the objects that compose the page. Each block $B^{(i)}$ is represented by the time of arrival of the first request, indicated by time $(B^{(i)})$, and by the set of IATs $V_1^{(i)}, \ldots, V_2^{(i)}, \ldots, V_{len(B^{(i)})-1}^{(i)}$ occurring between the following requests.

Computing IATs between adjacent requests whose timestamps are logged at a coarse one-second resolution can result in the generation of sequences of zeros. This can be common, for example, in web sites that receive tens to hundreds of requests within a second. In some examples, the IAT between the last request falling within a period of one second and the first request falling within the next period of one second is randomized by a uniform random number in [0,1] seconds to reduce noise introduced by the coarse resolution of the trace. This randomization results in a smoother probability distribution, which is easier to fit using mathematical models, as compared to noisier probability distribution functions.

Referring now to FIG. 3, a table 300 provides example statistical characteristics of an example set of blocks $B^{(i)}$ for an IAT and SVCT dataset (which include the sequences of zeros) for the case where $\mu=3.275$ and $c^2=11.56$. The statistical characteristics include the size of the dataset, the stationarity (for IAT and SVCT), the ACF-1 (for IAT and SVCT), and $c^2$ (for IAT and SVCT). Stationarity can be assessed using the Kwiatkowski-Phillips-Schmidt-Shin (KPSS) test, and $c^2>1$ indicates more variability than that in a Poisson process. To address residual non-stationarity in the blocks $B^{(i)}$, simulation-based predictions can be obtained by a cyclic concatenation of the trace in order to run one long simulation experiment for observing the convergence of performance metric estimates. This approach is more acceptable than performing the same type of repetition on a relatively long trace, such as one for a 24 hour period, because 1 hour is a more representative time scale for cloud resource allocation decisions.

The $MAP_{IAT}$ can be represented by $(D_0, D_1)$, and $MAP_{SVCT}$ can be represented by $(D_0', D_1')$. The maximum likelihood (ML) estimation is a classical approach for fitting workload models. ML estimation is particularly useful for estimating models from short datasets, such as datasets in which a single block $B^{(i)}$ provides only a few hundred to a few thousands samples $s_i$. Various characterizations of the IATs of HTTP requests and the respective SVCTs of these HTTP requests can be performed. In some examples, a multiclass model (K=2) distinguishes between static and dynamic IATs. In some examples, a single class model (K=1) does not distinguish between request types; therefore, the IATs can be computed between static and dynamic request types.

Referring now to the single class case (K=1), a PH distribution is a special case of a MAP where $D_1 = -D_0 \vec{1} \vec{\pi}$. Consequently, a pair $(\vec{\pi}, D_0)$ is sufficient to specify a PH distribution. This mathematical formula implies that the samples $s_i$ generated by the model are independent and identically distributed (i.i.d.), thus $\rho_k = 0$ for all $k \geq 1$. ML estimation seeks a pair $(\vec{\pi}, D_0)$ that maximizes the probability of observing the dataset obtained. Thus, for $B^{(i)}$:

$$\max_{(\vec{\pi}, D_0)} \mathbb{P}\left[V_1^{(i)}, \ldots, V_2^{(i)}, \ldots, V_{len(B^{(i)})-1}^{(i)} \mid \vec{\pi}, D_0\right] \quad (7)$$

subject to $\vec{\pi} \vec{1} = 1$ and the sign constraints of the entries in $D_0$. Approximating the IATs as independent random variables and taking the logarithm of the resulting expression provides:

$$\max_{(\vec{\pi}, D_0)} \sum_{j=1}^{len(B_i)-1} \log \mathbb{P}[V_j^{(i)} \mid \vec{\pi}, D_0] \quad (8)$$

where the argument $\mathbb{P}[V_j^{(i)} \mid \vec{\pi}, D_0]$ can be provided as the likelihood function for the IATs in block $B^{(i)}$. In particular, for a PH distribution, the likelihood function is:

$$\mathbb{P}[V_j^{(i)} \mid \vec{\pi}, D_0] = \vec{\pi} e^{D_0 V_j^{(i)}} (-D_0) \vec{1} \quad (9)$$

Accordingly, ML estimation provides a PH distribution describing the IATs by maximizing Equation 8 using Equation 9 and standard nonlinear solvers. The corresponding $MAP_{IAT}$ used in the $MAP_{IAT}/MAP_{SVCT}/1$ queuing model has the same matrix $D_0$, has the matrix $D_1 = -D_0 \vec{1} \vec{\pi}$, and is rescaled to the mean of each trace $B^{(i)}$. Rescaling can be achieved by multiplying all rates in $D_0$ and $D_1$ by $c = E[X_{old}]/E[X_{new}]$, where $E[X_{old}]$ is the current mean of $MAP_{IAT}$, and $E[X_{new}]$ is the desired value. This provides a single class approach for fitting a concatenated interval of traffic containing the sets of IATs $V_1^{(i)}, \ldots, V_2^{(i)}, \ldots, V_{len(B^{(i)})-1}^{(i)}$, for all $1 \leq i \leq I$, where $I$ is the total number of blocks of traffic that are analyzed.

The single class case ignores the correlation between requests. Consequently, the single class case performs better than a general fitting process to a MAP because auto-correlation estimates can be unreliable for short traces, as it is difficult to fit appropriate values for the autocorrelation coefficients. A more accurate approach includes the fitting for a multiclass case (K=2), where a MAP is used to fit the time-varying patterns arising from interleaving static and dynamic requests. The resulting MAP can be auto-correlated and thus is more accurate than the single class case (K=1).

Referring now to the multiclass case (K=2), the fitting process can include the fitting process discussed for the single class case (K=1) (i.e., Equations 7-9), except that two separate PH models, $PH^a = \{D_0^a, D_1^a\}$ and $PH^b = \{D_0^b, D_1^b\}$, are fit for the static IAT dataset and the dynamic IAT dataset, respectively. For the static requests, the IATs $V_j^{(i)}$ refer to the times between the static requests in the static dataset, and for the dynamic requests, the IATs $V_j^{(i)}$ refer to the times between the dynamic requests in the dynamic dataset. In general, the aggregate flow of static and dynamic request types to the server system can be described by a MAP that represents the superposition of a static flow and a dynamic flow that are treated independently of each other.

The superposition of two PH distributions can be used to generate the MAP, as follows:

$$MAP = PH^a \oplus PH^b = \{D_0^a \oplus D_0^b, D_1^a \oplus D_1^b\} \quad (10)$$

where $\oplus$ denotes the Kronecker sum operator, which describes the IATs between activation of observable transitions either in $PH^a$ or in $PH^b$. In other words, superposing the flows from the two types of workloads represents IATs of requests originating from two independent sources ($PH^a$ and $PH^b$) for which the result is generally a MAP, and not a PH model. This occurs because the superposition of i.i.d. arrival processes is not in general an independent flow of requests and may show auto-correlation and burstiness (i.e., observed on a plot as uneven, short spikes of peak congestion during the lifetime of the system). Workload burstiness rules out independence of time samples and is expressed by the dependence structure of the request flows. This dependence structure is described and quantified via the autocorrelation function (ACF). Depending on the degree of autocorrelation, burstiness can be observed. This means that the sudden arrival flows to a system (also known as flash crowds) relate to IAT samples that are autocorrelated.

In some examples, ML estimation can be applied to blocks $B^{(i)}$ after temporarily removing sequences of zero IAT values. To account for zeros in the original trace, requests falling within the same one second period are merged as a single logical request. The corresponding SVCTs for these requests are also merged. Thus, in this transformed model, the arrival trace is the trace (without the zeros) that has been fitted, and the resulting SVCT trace is an aggregated trace; that is, the effect of the zeros is only observed in the SVCT trace. To account for this transformation, the mean queue length and the throughput of the queuing results obtained can be scaled using the aggregated trace (or its fitted MAP model). The scaling factor for $B^{(i)}$ can be provided as the ratio:

$$R_f = \frac{len(B^{(i)})}{len(B^{(i)}) - zeros(B^{(i)})} \quad (11)$$

where $zeros(B^{(i)})$ is the number of zero IAT values in block $B^{(i)}$ before filtering.

In some implementations, the performance of a server system can be modeled by the $MAP_{IAT}/MAP_{SVCT}/1$ queuing model, which is a CTMC having infinitesimal generator:

$$Q = \begin{bmatrix} \overline{A}_0 & \overline{A}_1 & & \\ A_{-1} & A_0 & A_1 & \\ & A_{-1} & A_0 & A_1 \\ & & \ddots & \ddots & \ddots \end{bmatrix} \quad (12)$$

where $A_1 = D_1 \otimes I$, $A_0 = D_0 \otimes D_{0'}$, $A_{-1} = I \otimes D_{1'}$, and $\overline{A}_0 = D_0 \otimes I$, where I is the identity matrix, and $\otimes$ is the Kronecker product. The matrix Q is referred to as a QBD process since it generalizes by block transitions the classic birth-death process of an M/M/1 queue that has scalar transition rates. This can enable the integration of complex workload descriptions obtained for IATs and SVCTs from logfile traces into the queuing analysis of a web server. The probability for states that pertain to block row k=0,1,... is described by a vector $\vec{v}_k$ such that $\vec{v}_k \vec{1} = v_k$ is the probability of observing k requests in queue. In particular, $v_0$ describes the probability of the queue being empty, thus $v_0 = 1 - \rho$, where $\rho$ is the utilization of the server. The matrix geometric method proves under certain assumptions that there exists a matrix R such that:

$$\vec{v}_k = \vec{v}_0 R^k, k > 0 \quad (13)$$

The matrix R is the minimal non-negative solution of the equation $A_1 + RA_0 + R^2 A_{-1} = 0$, and $\vec{v}_0$ is the solution to equations where:

$$\vec{v}_0(\overline{A}_0 + RA_{-1}) = 0, \vec{v}_0(1-R)^{-1}\vec{1} = 1 \quad (14)$$

Accordingly, the queue-length probability distribution in a queuing model for a server with IATs ($D_0$, $D_1$) and SVCTs ($D_0'$, $D_1'$) fitted from a real log-file trace can be provided. The queuing model provides a device for easy computation of performance measures including various parameters that provide the expected performance of the server. The performance can include the tail distribution $P[Q>x]$ of the number of server requests in the system, the mean queue length $E[Q]$, and the mean response time of system requests $E[R]$ (a metric used in QoS prediction), respectively provided as follows:

$$P[Q > x] = \sum_{k=x+1}^{\infty} \vec{v}_k \vec{1}, x \geq 0 \quad (15)$$

$$E[Q] = \sum_{k=0}^{\infty} k\vec{v}_0 R^k \vec{1} = \vec{v}_0 R(I-R)^{-2}\vec{1} \quad (16)$$

$$E[R] = \lambda^{-1}(\vec{v}_0 R(I-R)^{-2}\vec{1}) \quad (17)$$

Difficulties can arise in the fitting process of SVCTs, because two-state MAPs impose constraints on the moments and auto-correlation values that can be fit by the model. In some implementations, the trace can be split into equal parts (e.g., separated by the median) and fit independently to corresponding datasets, the individual models then being merged into a final MAP using the superposition technique. In this manner, separate MAPs fitted for small and large SVCTs can be used to approximate a model for the original trace by using the superposition technique, which results in four-state MAPs.

Figure 4B:
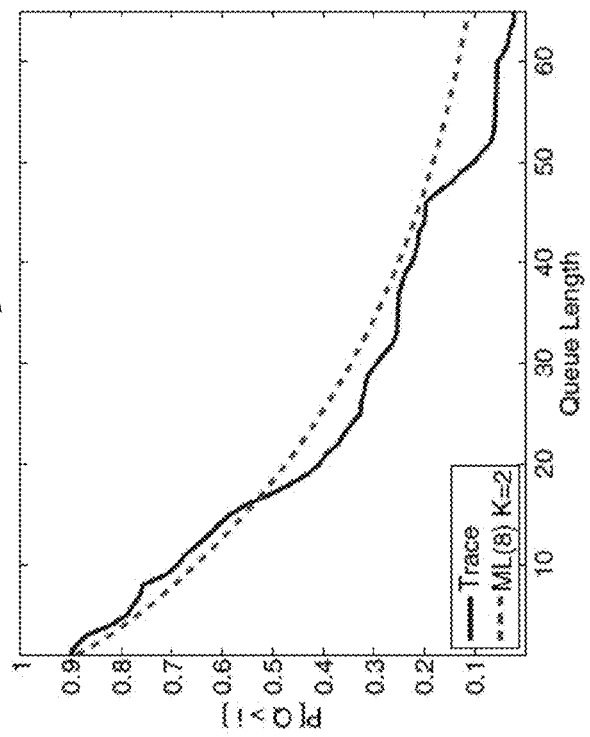
FIGS. 4A and 4B depict example queue length tail distributions based on queuing models provided in accordance with implementations of the present disclosure.
Figure 4A:
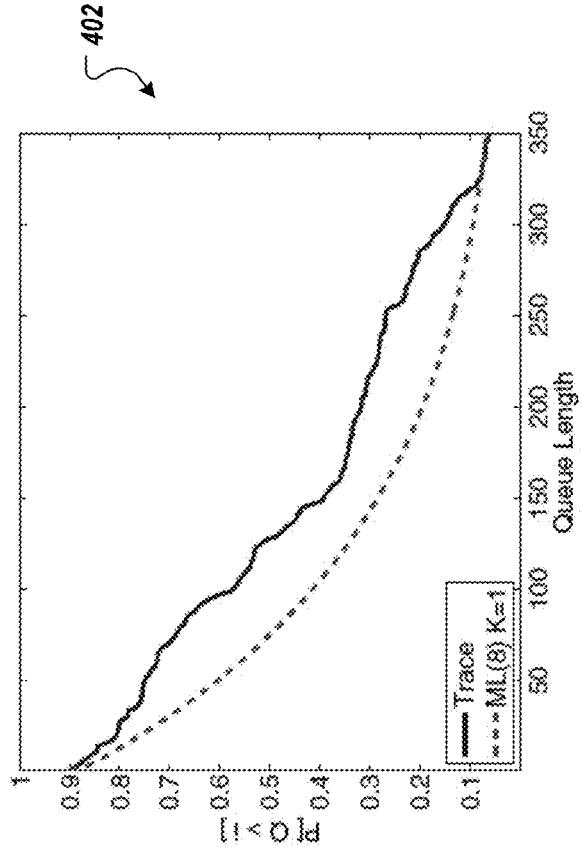

Referring now to FIGS. 4A and 4B, example queue length tail distributions 402 and 404 of a $MAP_{IAT}/MAP_{SVCT}/1$ queuing model are provided for a single class case (K=1) for block $B^{(3)}$, and a multiclass case (K=2) for block $B^{(4)}$, respectively. The queue length tail distributions 402, 404 demonstrate that the predicted model results closely match corresponding tail distributions that can be obtained from trace-driven simulations.

With particular reference to FIG. 4A, ML unified models of order J=8 are fit by inversely characterizing the IAT. The resulting model can be re-scaled to the mean of block $B^{(3)}$. Smaller or larger mean values can be used to evaluate the server system's response under increased or decreased utilizations, respectively. The SVCT of the aggregated trace is fitted by utilizing tools for fitting an empirical dataset into a Markov model such as a MAP (e.g., standard textbook formulas provided in a computer-implemented script). As depicted in FIG. 4A, the resulting SVCT model (of order J=2), closely models not only the initial moments of the distribution, but also the auto-correlation with ACF-1=0.32 (the actual value is ACF-1=0.38). As discussed, $MAP_{IAT}$ and $MAP_{SVCT}$ models are integrated to provide the MAP/MAP/1 queuing model, whose resulting mean queue length can be re-scaled to the original trace. In the aggregated trace representation of block $B^{(3)}$, a job queuing is equivalent to observe 4.76 jobs in the queue. Queuing model accuracy can be quantified, and the difference between the simulation and analytical mean queue length prediction is minimal at 0.95%. This discrepancy can be a result of simulation inaccuracies. For comparison purposes, an example simulation run including sampling ten million elements for each of the processes takes on average five minutes to process and provide results. In contrast, analytical results provided using a queuing model in accordance with the present disclosure are almost immediate, often in a fraction of a second, given the MAP models and the exact system utilization parameter as input.

Figure 5:
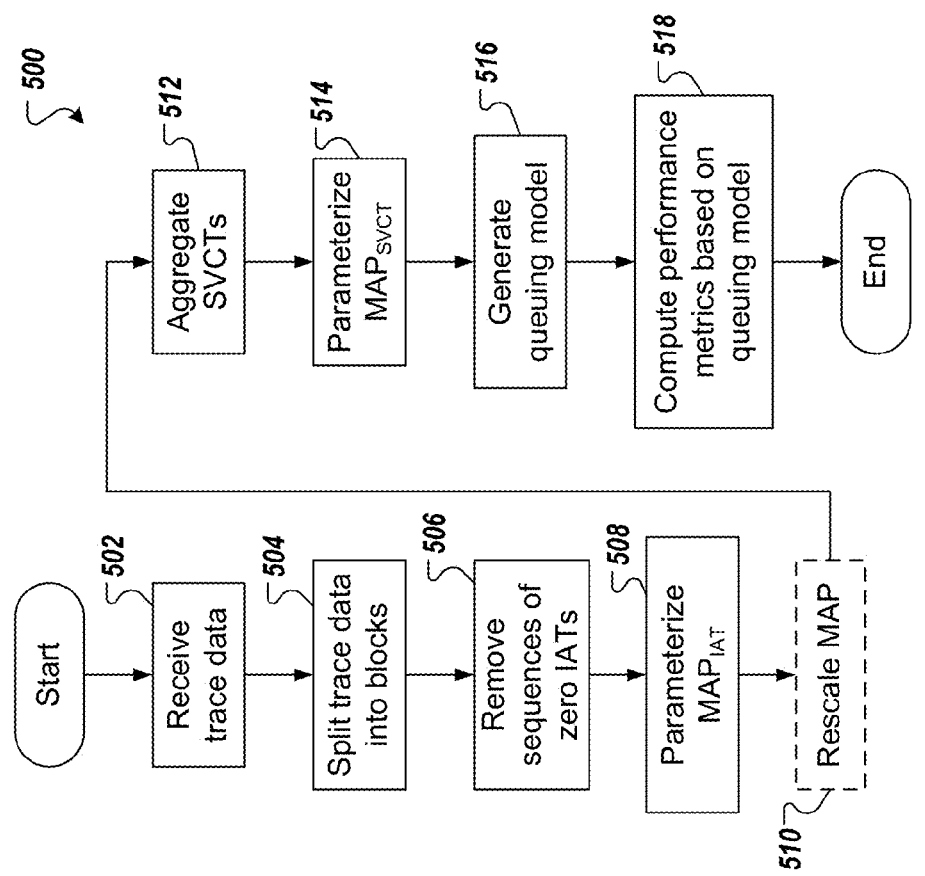
FIG. 5 depicts an example process that can be executed in accordance with implementations of the present disclosure.

Referring now to FIG. 5, an example process 500 that can be executed in accordance with the present disclosure is provided. Trace data is received (502). In some examples, the trace data is included in a log file that is provided to a computing device, and can include trace data corresponding to a plurality of service requests from one or more clients to a server system. The trace data is split into a plurality of blocks (504). In some examples, each block represents a time period, during which the average behavior of the server system is considered stationary. Sequences of zero IATs are removed from the plurality of blocks (506). A first MAP is parameterized for IATs of requests (508). In some examples, the IATs are provided in or are determined from the trace data. In some examples, the parameterized first MAP is rescaled (510) based on the plurality of blocks. Rescaling of the first MAP can be an optional action. SVCTs are aggregated (512). In some examples, the SVCTs are determined from the trace data. The SVCTs can be aggregated depending on whether or not zeros were removed from the trace. A second MAP is parameterized (514). The second MAP corresponds to SVCTs of the requests received at the server system. A queuing model is generated (516). The queuing model include the first MAP and the second MAP and is provided as a MAP/MAP/1 queuing model. Performance metrics of a server system are calculated based on the queuing model (518). In some examples, performance metrics can include server utilization, queue length of requests waiting to be served and expected response times at server side.

In some implementations, the performance metrics can be used as input to a decision process regarding the server system. For example, the addition or deletion of resources (e.g., server computing devices within the server system) can be influenced based on the calculated performance metrics (e.g., if the server system is under-performing, resources can be added to compensate for heavy traffic, if the server system has low utilization other requests can be directed to the server system and/or resource of the server system can be taken offline).

Referring now to FIG. 6, a schematic illustration of example hardware components 600 that can be used to execute implementations of the present disclosure is provided. The system 600 can be used for the operations described in association with the methods described herein. For example, the system 600 may be included in the application server system 106. The system 600 includes a processor 610, a memory 620, a storage device 630, and an input/output device 640. Each of the components 610, 620, 630 and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for generating a queuing model, comprising:
   receiving, at a computing device, trace data provided in a trace log file corresponding to a server;
   parameterizing, using the computing device, a first Markovian Arrival Process (MAP) model based on the trace data;
   parameterizing, using the computing device, a second MAP model based on the trace data;
   defining a queuing model that models a performance of the server and that includes the first MAP model and the second MAP model, the queuing model modeling arrival of incoming requests as a stochastic process; and
   storing the queuing model in computer-readable memory.

2. The method of claim 1, wherein the trace data comprises data corresponding to a plurality of requests arriving at the server.

3. The method of claim 2, wherein each request of the plurality of requests is one of a static request and a dynamic request.

4. The method of claim 1, wherein parameterizing the first MAP model is based on request inter-arrival times.

5. The method of claim 4, wherein the request inter-arrival times are computed based on timestamps provided in the trace data.

6. The method of claim 4, wherein a request inter-arrival time is provided as a time elapsed between successive requests received at the server.

7. The method of claim 4, further comprising removing sequences of zero inter-arrival times from the inter-arrival times that have been requested to provide an adjusted set of inter-arrival times.

8. The method of claim 7, wherein parameterizing the first MAP model is based on the adjusted set of inter-arrival times.

9. The method of claim 1, wherein parameterizing the first MAP model is achieved using a maximum likelihood fitting method.

10. The method of claim 1, wherein parameterizing the second MAP model is based on a plurality of service times, the service times being determined from the trace data.

11. The method of claim 10, further comprising determining the service times based on whether each of the plurality of requests is one of a static request and a dynamic request.

12. The method of claim 10, wherein a service time is provided as a time that the server spends servicing a request.

13. The method of claim 10, further comprising aggregating the service times.

14. The method of claim 1, further comprising splitting the trace data into blocks.

15. The method of claim 1, further comprising calculating one or more performance metrics using the queuing model.

16. The method of claim 15, wherein the one or more performance metrics comprise one or more of a tail distribution of the plurality of requests, a mean queue length, and a mean response time of system requests.

17. The method of claim 15, further comprising:
   receiving user input at the computing device; and
   providing the user input as input to the queuing model, wherein the one or more performance metrics are calculated based on the user input.

18. The method of claim 1, wherein the server comprises a web server.

19. A non-transitory computer-readable storage medium coupled to one or more processors and having instructions stored thereon which, when executed by the one or more processors, cause the one or more processors to perform operations comprising:
   receiving trace data provided in a trace log file corresponding to a server;
   parameterizing a first Markovian Arrival Process (MAP) model based on the trace data;
   parameterizing a second MAP model based on the trace data;
   defining a queuing model that models a performance of the server and that includes the first MAP model and the second MAP model, the queuing model modeling arrival of incoming requests as a stochastic process; and
   storing the queuing model in computer-readable memory.

20. A system, comprising:
   one or more processors; and
   a non-transitory computer-readable storage medium coupled to the one or more processors and having instructions stored thereon which, when executed by the one or more processors, cause the one or more processors to perform operations comprising:
      receiving trace data provided in a trace log file corresponding to a server;
      parameterizing a first Markovian Arrival Process (MAP) model based on the trace data;
      parameterizing a second MAP model based on the trace data;
      defining a queuing model that models a performance of the server and that includes the first MAP model and the second MAP model, the queuing model modeling arrival of incoming requests as a stochastic process; and
      storing the queuing model in computer-readable memory.

* * * * *